US012027149B2

(12) United States Patent
Salter et al.

(10) Patent No.: US 12,027,149 B2
(45) Date of Patent: Jul. 2, 2024

(54) MOTOR VEHICLE WORKSPACE WITH ENHANCED PRIVACY

(71) Applicant: FORD GLOBAL TECHNOLOGIES, LLC, Dearborn, MI (US)

(72) Inventors: Stuart C. Salter, White Lake, MI (US); Brendan F. Diamond, Grosse Pointe, MI (US); John R. Van Wiemeersch, Novi, MI (US); Pietro Buttolo, Dearborn Heights, MI (US); Ryan O'Gorman, Beverly Hills, MI (US); Joshua R. Wheeler, Trenton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/369,283

(22) Filed: Sep. 18, 2023

(65) Prior Publication Data

US 2024/0005900 A1 Jan. 4, 2024

Related U.S. Application Data

(63) Continuation of application No. 17/731,360, filed on Apr. 28, 2022, now Pat. No. 11,804,207.

(51) Int. Cl.

| | |
|---|---|
| ***G10K 11/175*** | (2006.01) |
| ***G10L 25/51*** | (2013.01) |
| ***H04R 1/02*** | (2006.01) |
| ***H04R 1/08*** | (2006.01) |
| ***H04R 1/32*** | (2006.01) |
| ***H04R 3/00*** | (2006.01) |

(52) U.S. Cl.
CPC .......... *G10K 11/1754* (2020.05); *G10L 25/51* (2013.01); *H04R 1/025* (2013.01); *H04R 1/08* (2013.01); *H04R 1/323* (2013.01); *H04R 3/00* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 8,112,272 | B2 | 2/2012 | Nagahama et al. |
| 9,076,430 | B2 | 7/2015 | Horrall et al. |
| 9,978,272 | B2 | 5/2018 | Basir |

(Continued)

FOREIGN PATENT DOCUMENTS

| | | | |
|---|---|---|---|
| WO | 2021023667 | A1 | 2/2021 |

*Primary Examiner* — Kenny H Truong
(74) *Attorney, Agent, or Firm* — Frank L. Lollo; MacMillan, Sobanski & Todd, LLC

(57) ABSTRACT

A transportation vehicle provides a workspace in a passenger cabin to support a teleconference with a remote party. External sensors are configured to scan the exterior of the vehicle. A sound exciter is configured to generate a masking noise directed to the exterior. A control circuit which enhances privacy of the teleconference is configured to A) detect the audio content of the teleconference being present in the interior of the vehicle, B) quantify an interior sound level of the audio content, C) estimate a discernability of the audio content at an external location accessible to passersby where the audio content can be overheard, and D) activate the sound exciter such that the masking noise is adapted to mask the audio content at the external location.

20 Claims, 5 Drawing Sheets

(56) References Cited

U.S. PATENT DOCUMENTS

| | | | | |
|---|---|---|---|---|
| 10,065,561 | B1 | 9/2018 | Bastyr et al. | |
| 10,106,080 | B1 | 10/2018 | Hassani et al. | |
| 11,943,581 | B2 * | 3/2024 | Shin | G06V 20/56 |
| 2012/0114130 | A1 | 5/2012 | Lovitt | |
| 2021/0127204 | A1 * | 4/2021 | Porta | G06N 20/20 |
| 2022/0080965 | A1 | 3/2022 | Watabe et al. | |

* cited by examiner

MOTOR VEHICLE WORKSPACE WITH ENHANCED PRIVACY

CROSS REFERENCE TO RELATED APPLICATIONS

This application is a continuation of co-pending U.S. application Ser. No. 17/731,360, filed Apr. 28, 2022, which is incorporated herein by reference.

STATEMENT REGARDING FEDERALLY SPONSORED RESEARCH

Not Applicable.

BACKGROUND OF THE INVENTION

The present invention relates in general to transportation vehicles, and, more specifically, to providing a motor vehicle having a passenger cabin adapted for performing as an office or other work environment which can maintain privacy of conversations/teleconferences in the passenger cabin.

In addition to traveling from place to place, vehicle consumers are becoming increasingly interested in engaging in diverse activities within their vehicles. For example, a vehicle and its electronic accessories may be utilized to institute an office-type work environment including work surfaces, business machines, and/or telecommunications services. For example, construction personnel at a construction site or other job site may need a protected space in which to review or update documents or to participate in teleconference calls with remote parties. An interior passenger cabin of a vehicle can be advantageously configured to provide such a space. Unlike traditional offices in a fixed building or home, however, a vehicle work environment may be subject to public perception when pedestrians are justifiably close to the vehicle. This creates a need for privacy measures in order to meet the usual expectations for standard workplaces.

In some instances, two or more persons may wish to share the space which can lead to potential disruption between their separate activities. For example, one or more occupants of the vehicle may conduct a teleconference with a remote party using an open microphone(s) and speakers wherein the conversation is distracting to others in the vehicle, or the contents of the conversation are meant to be kept private from others inside or outside the vehicle. It would be especially desirable to prevent the hearing of private conversations by persons outside the vehicle. In addition, multiple occupants in the vehicle may attempt to conduct separate teleconferences (or a teleconference and a separate face-to-face conversation) simultaneously so that the audio content of one discussion may impinge on the other. It would also be desirable to filter out the effects of any crossover between conversations.

SUMMARY OF THE INVENTION

The present invention helps ensure that pedestrians (e.g., people passing nearby a vehicle) do not hear private conversations occurring inside the vehicle. For example, microphones inside the vehicle can be used to measure the loudness of the private sounds, and then an evaluation is made whether it is possible for a passerby to hear the private conversation. If so, then a masking noise is projected outside the vehicle to the external location accessible to a passerby which renders the private conversation undiscernible.

For purposes of having multiple, independent conversations in the cabin of the vehicle, a controller may determine how many occupants are present (e.g., using an interior camera, seat sensors, or other means) and tracks the positions and orientations of their head/ear/mouth while they are participating on a teleconference call. The positions/orientations are used to adjust speaker and/or microphone performance to optimize each call to the corresponding occupant(s). Furthermore, the vehicle controller may also employ audio signatures of each occupant to process audio signals from the microphones to isolate audio content of one particular occupant from the other occupants. Separating the audio signals according to each speaking person can be achieved using artificial intelligence (AI) or Machine Learning (ML) de-mixing technology as known in the art. Spoken audio corresponding to each individual occupant can then be steered to the appropriate remote party with less interference whenever other conversations are occurring in the vehicle.

In one aspect of the invention, a transportation vehicle comprises a passenger cabin defining an interior, an exterior, and at least one seating location in the interior for conducting a teleconference with a remote party. At least one internal microphone receives a first portion of an audio content of the teleconference spoken by a vehicle occupant. At least one internal speaker generates a second portion of the audio content of the teleconference spoken by a remote party. A sound exciter is configured to generate a masking noise directed to the exterior. A control circuit which enhances privacy of the teleconference is configured to A) detect the audio content of the teleconference being present in the interior of the vehicle, B) quantify an interior sound level of the audio content, C) estimate a discernability of the audio content at an external location accessible to passersby where the audio content can be overheard by passersby, and D) activate the sound exciter such that the masking noise is adapted to mask the audio content at the external location.

DETAILED DESCRIPTION OF PREFERRED EMBODIMENTS

In addition to desk-like surfaces and large built-in display screens for enabling office productivity applications, a vehicle passenger cabin can be configured to provide personal sound zones adapted to provide some audio isolation between zones during teleconferencing calls. For example, interior cameras may track ear/head locations and orientations in different occupant zones to adjust audio sound production and/or microphone sensitivity for targeting respective occupants of the zones. The microphones or loudspeakers may be directional. Several microphones may be deployed in the walls, ceiling, instrument panel, or other structures of the passenger cabin, and loudspeakers may be deployed in those locations and in the passenger headrests. Personal mobile devices may also be used (e.g., an occupant's smartphone linked by a Bluetooth® connection).

A vehicle controller may be used to filter, combine, isolate, or pass-through various audio signals as needed to facilitate an optimized teleconferencing experience for each occupant in the vehicle to ensure other participants on a call only hear audio from the correct vehicle occupant as well as to ensure the occupants of the vehicle do not hear the conversations from others in the vehicle. The vehicle controller may control microphone settings, speaker volume and cancelation properties, for example. The vehicle controller may access interior cameras to determine which occupants are speaking in order to steer the audio signals accordingly.

Figure 1:
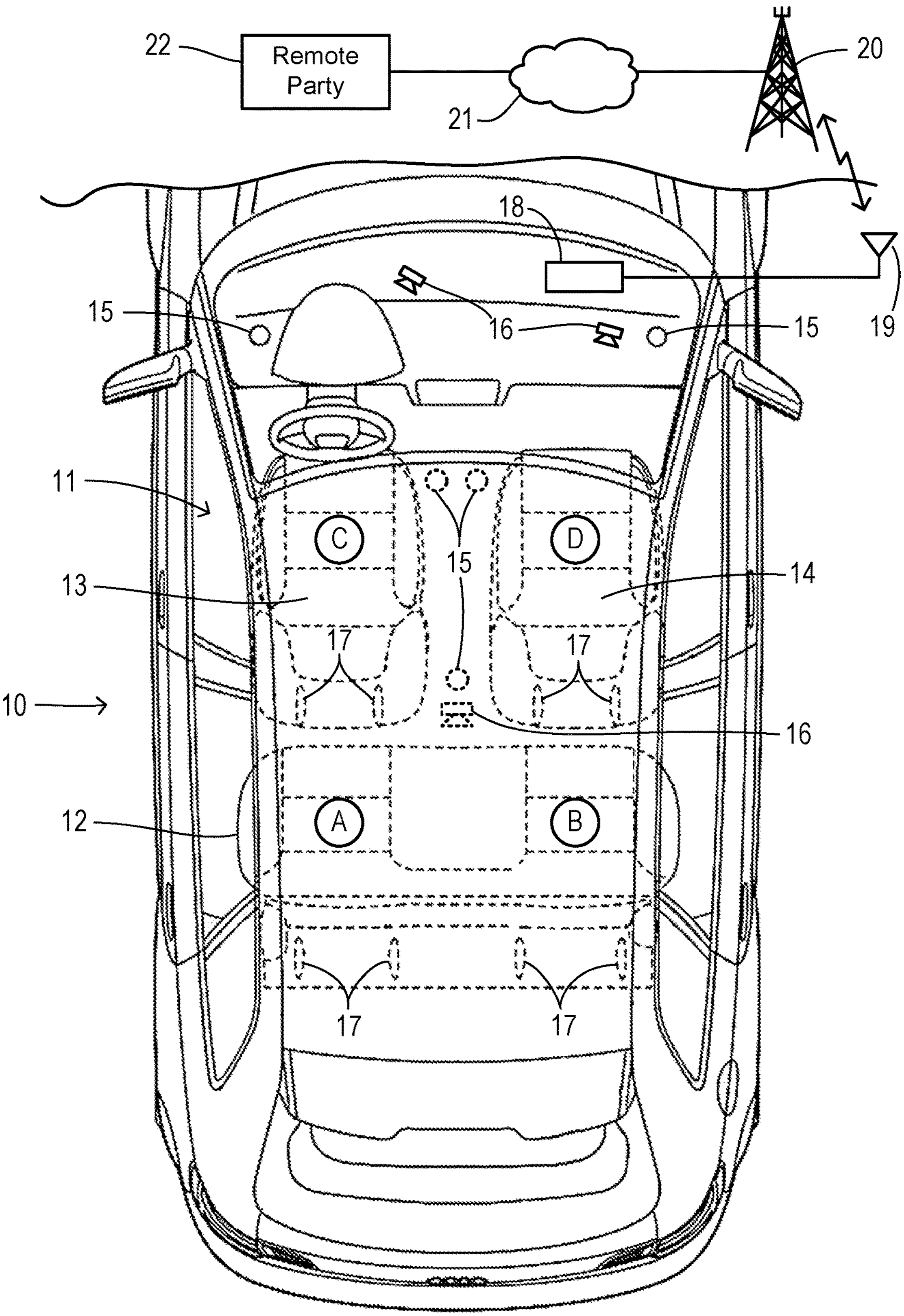
FIG. 1 is a schematic diagram showing a vehicle and remote components for conducting a teleconference.

Referring to FIG. 1, a vehicle 10 has a passenger cabin 11 including a rear seating row 12 and front seats 13 and 14 for accommodating vehicle occupants who may utilize cabin 11 as a virtual office environment in which teleconferences may be conducted. For conducting multiple teleconferences simultaneously for different occupants, a plurality of zones may be defined for conducting respective teleconferences, such as individual zones A, B, C, and D. Deployed throughout cabin 11 are a plurality of microphones 15 and a plurality of cabin loudspeakers 16. Each seating position may also include a pair of near-field headrest speakers for effectively targeting sounds to the respective seating positions.

A control module 18 is configured to provide audio processing associated with one or more teleconferences being conducted within cabin 11 using corresponding ones of microphones 15 and loudspeakers 16/17. Control module 18 may include, or is connected to, a wireless transceiver such as a cellular transceiver for communicating with a remote site 20 (such as a cellular telephone base station). Site 20 is coupled to a telephone network 21 for completing a teleconference call with a remote party 22.

Figure 2:
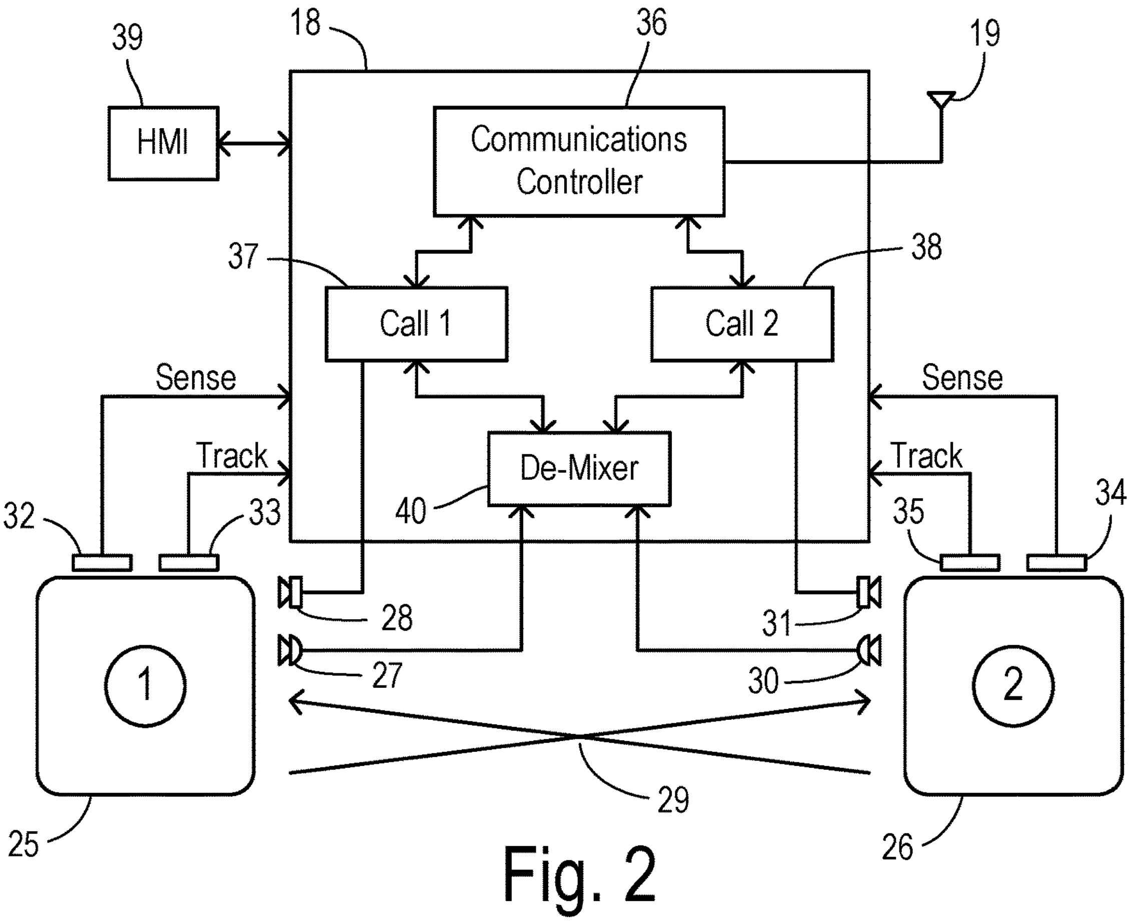
FIG. 2 is a block diagram showing a system for conducting multiple teleconferences within a vehicle passenger cabin.

FIG. 2 shows elements of the vehicle in greater detail. A first seat 25 provides a first zone and a second seat 26 provides a second zone. Audio transducers for conducting teleconferencing calls may include a microphone 27 and a speaker 28 deployed to cover seat 25 and a microphone 30 and a speaker 31 deployed to cover seat 26. A seat occupancy sensor 32 is associated with seat 25, and a seat occupancy sensor 34 is associated with seat 26. A tracking sensor 33 is associated with seat 25, and a tracking sensor 34 is associated with seat 26. Control module 18 is coupled to sensors 32 and 34 for identifying whether an occupant is present within the respective seats and to sensors 33 and 35 for assessing the position/orientation of an occupant's head when a respective seat is occupied.

A human-machine interface (HMI) 39 is coupled to control module 18 for enabling vehicle occupants to perform setup and operations commands which control one or more teleconferences. HMI 39 may include a touchscreen display panel, a voice command interface, or other interfaces as known in the art. Among the commands that may be initiated via HMI 39 are commands for designating whether a teleconference is of a sensitive nature and should be kept private from passersby.

Control module 18 includes a communications controller 36 coupled to antenna 19. Communications controller 36 functions as a wireless transceiver (e.g., a cellular transceiver for carrying out cellular phone calls or a Bluetooth® node for exchanging audio signals with an occupant's mobile phone which completes a call). A first call interface 37 processes two-way audio for a first call conducted by an occupant in the first zone, and a second call interface 38 processes two-way audio for a second call conducted by an occupant in the second zone. Due to the relatively small size of a vehicle passenger cabin, some amount of crosstalk of sounds 29 between the first and second zones is likely to occur so that audio exchanged in one call includes an added signal from other sound in the cabin (e.g., another call in the other zone). In order to isolate the desired voice for a particular call from other calls or extraneous sounds in the vehicle, a de-mixer 40 receives all the microphone signals from microphones 27 and 30. As known in the art, an audio signature of each occupant in the vehicle can be obtained using de-mixing techniques employing artificial intelligence and/or machine learning. After filtering out audio content not to be included in the teleconference for Call 1, de-mixer 40 sends an audio signal to call interface 37 which extracts the speaking of the occupant in seat 25. Likewise, after filtering out audio content not to be included in the teleconference for Call 2, de-mixer 40 sends an audio signal to call interface 38 which extracts the speaking of the occupant in seat 26.

To ensure pedestrians (i.e., passersby or any other bystanders located within a close proximity to the vehicle) do not hear private conversations from the inside of the vehicle, a masking noise may be distributed to the exterior in appropriate circumstances to interfere with the ability of the pedestrians to discern the contents of the conversations. In particular, microphones inside the vehicle can determine the loudness of the conversation and whether it is possible for a pedestrian to perceive the conversation occurring in the vehicle. The invention may only take action when it is determined that the content of the conversation is discernible to the pedestrian (i.e., that the speech would be intelligible based on typical loudness thresholds and acoustic properties of the sounds such as frequency spectrum. While a private conversation is on-going and the vehicle is not moving (or moving at very low speed), exterior monitoring sensors such as radars and cameras can scan the environment to determine the distance/direction of pedestrians relative to the vehicle. Conversation loudness derived by an audio system for the teleconference can be compared to a threshold (e.g., a loudness threshold). The threshold may be determined during vehicle development to correlate a pedestrian's distance to the discernibility of the conversations. In some embodiments, a distance threshold based on the loudness of the conversation is compared to a measured distance of the pedestrian(s). Thus, the threshold may characterize discernibility based on the pedestrian location and the actual loudness of the conversation. When the conversation is discernible, sound exciters (e.g., loudspeakers) on the vehicle exterior can be used to play masking noise which renders the conversation undiscernible. Activation of the masking noise can have time hysteresis such that once it is enabled, it does not disable for a set period of time or until the pedestrian moves away to a distance greater than a predetermined threshold distance.

Figure 3:
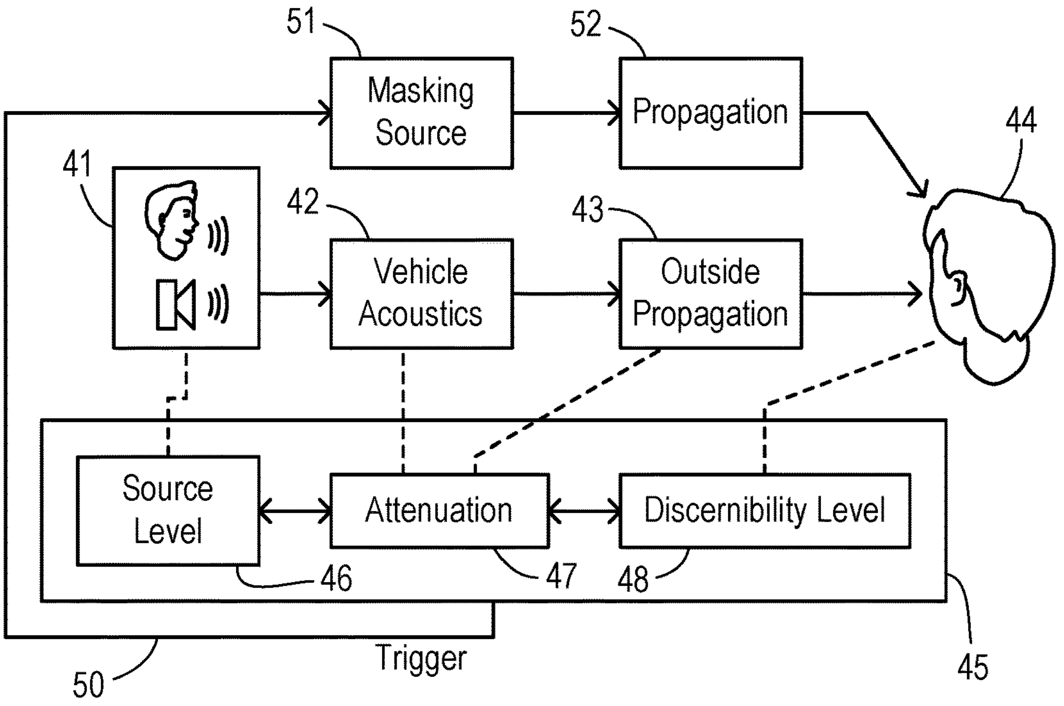
FIG. 3 is a schematic diagram depicting the propagation of sound including private audio content and a masking sound of the present invention.

FIG. 3 illustrates functions of the invention and the effects upon the ability of pedestrians to overhear a private conversation. Inside the passenger cabin of the vehicle, a sound source 41 for a private teleconference may include both spoken sounds from vehicle occupants and emitted sounds from vehicle-mounted loudspeakers (e.g., during a handsfree call). Source 41 emits the sounds at an initial loudness or intensity. The sounds are acted upon by vehicle acoustics 42 which attenuate the loudness of the sounds by a determinable amount before reaching an exterior of the vehicle. Once outside the vehicle, the sounds are further attenuated according to outside propagation 43 until reaching the ears of a pedestrian 44. As shown by a sound model 45, a relationship exists between (i) a source level 46 at source 41, (ii) an attenuation 47 encapsulating the cumulative attenuation of vehicle acoustics 42 and outside propagation 43, and (iii) a discernibility level 48 at the location of pedestrian 44. Based on these levels and the overall attenuation, a trigger signal 50 can be generated when model 45 is evaluated. Trigger signal 50 controls a masking source 51 on the exterior of the vehicle to generate a masking noise which itself is further subject to a propagation path 52 with its own attenuation before reaching pedestrian 44 to interfere with (i.e., mask) the private conversation.

As used herein, masking noise means any sounds perceptible to the pedestrian which reduce the signal to noise ratio with reference to the private conversation sounds as evaluated at the location of the pedestrian. The masking noise can include music, predetermined tones, or random noise. Random noise may include white noise (i.e., broadband randomized signals). However, a random noise with a frequency spectrum which emphasizes the frequencies corresponding to the spoken conversation to be masked (e.g., 250 Hz to 4 kHz) is more preferable. The random noise can be derived from any uncorrelated signals that when added to the sound of the private conversation at the location of the pedestrian results in a reduction of the signal to noise ratio which is sufficient to make the conversation indiscernible. This may, for example, necessitate that a loudness of the masking noise be greater than a loudness of the conversation by a predetermined margin (e.g., measured in dB at the pedestrian location).

Figure 4:
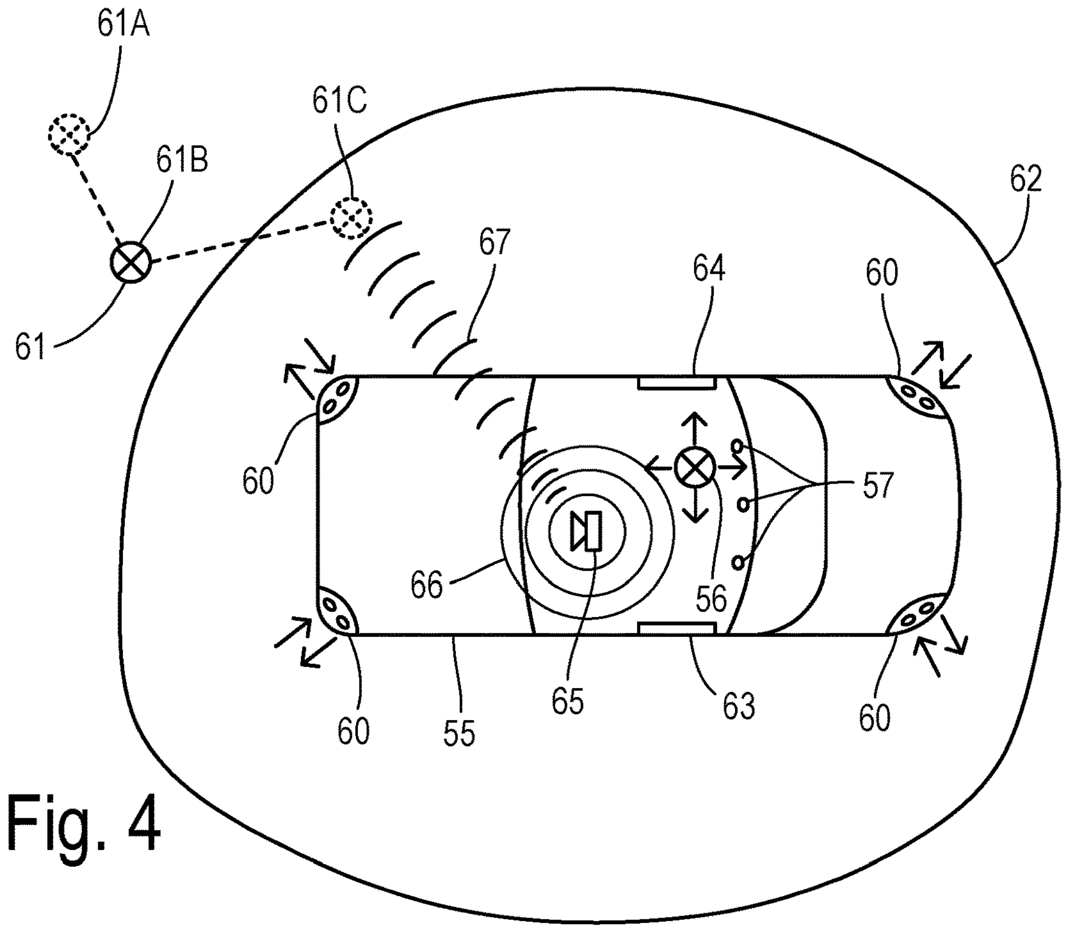
FIG. 4 schematically depicts a vehicle and a tracked pedestrian with a region within which possible interception of private audio content may occur.

FIG. 4 shows a vehicle 55 in which an occupant 56 is speaking as part of a teleconference. The spoken sounds are received by microphones 57 as a first portion of an audio content of the teleconference for transmission to a remote party. The microphone signals as well as audio signals from the remote party (a second portion of the audio content) which are converted to sound by loudspeakers (not shown), are used to quantify an interior sound level of the audio content. Vehicle 55 has external sensors configured to scan the exterior of the vehicle and configured to detect a pedestrian 61 in the exterior, including suites of radar transceivers and/or optical cameras 60. Preferably, sensor suites 60 have a range which is sufficient to detect pedestrian 61 at any distances for which the overhearing of conversations could occur. Sounds spoken by occupant 56 may spread in all directions within vehicle 55, and resulting sound levels exiting from vehicle 55 in various directions can be determined using testing data conducted using test sounds during development of a particular model of vehicle, for example. The emitted sound levels may depend on the open or closed state of vehicle windows, doors, or moonroof, such as windows 63 and 64, or the direction in which the speaker is facing.

In some embodiments, the measured interior sound level of the audio content can be used to determine a threshold distance measured from vehicle 55 at which loudness of the spoken conversation becomes discernible to a typical pedestrian. A region 62 in FIG. 4 represents the threshold distance around vehicle such that as pedestrian 61 is tracked along a path from positions 61A to 61B to 61C, a sound exciter 65 is activated when pedestrian 61 enters region 61 so that pedestrian 61 hears a masking noise adapted to mask the audio content at location 61C. Sound exciter 65 may be comprised of a loudspeaker or other vibratory transducer. Sound production may be omnidirectional as shown at 66 or directional as shown at 67 for focusing sound energy as needed at pedestrian 61.

Figure 5:
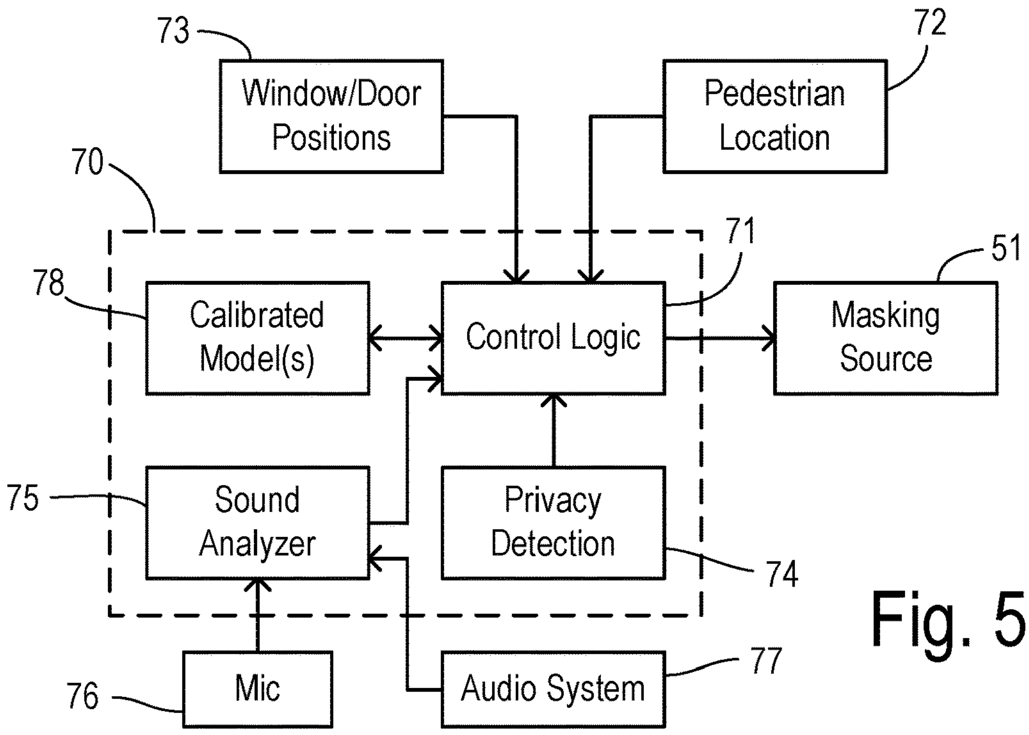
FIG. 5 is a block diagram showing one preferred embodiment of apparatus of the invention.

FIG. 5 provides a block diagram of apparatus of a preferred embodiment wherein a controller 70 implements control logic 71 to perform the functions of the present invention. In concert with external sensors scanning the exterior of the vehicle, control logic receives a pedestrian location 72. Control logic 71 receives window/door position data 73 from sensors or dedicated controllers for the windows and doors (e.g., via a multiplex bus) for use in evaluating how well interior sound travels outside the vehicle.

Controller 70 includes a privacy detection block 74 coupled to control logic 71. Preferably, the exterior sound exciter can be used to generate masking noise only when a privacy mode has activated. Privacy detection block 74 can initiate the privacy mode according to a manual activation by a vehicle occupant (e.g., via the HMI), automatically according to a scheduled time for a teleconference (e.g., identified via an occupant's smartphone calendar), automatically according to a predetermined list of call participants, or by detecting a keyword spoken by a vehicle occupant matching a predetermined list of keywords which identify private subject matter.

For purposes of estimating a discernability of the audio content at an external location corresponding to the detected pedestrian, controller 70 includes a sound analyzer block 75 which determines a sound attenuation between the vehicle interior and the external location (or a range of locations when determining a region such as region 62 in FIG. 4). Sound analyzer 75 receives audio content from one or more interior microphones 76 and/or from an audio system 77. Sound analyzer 75 may receive the audio signals themselves for quantifying the interior sound level(s) of the audio content or it may receive metadata if audio system 77 is able to provide sound level information, for example. Based on the interior sound level, control logic 71 estimates a discernability of the audio content at an external location corresponding to the detected pedestrian. The estimate may be based on calibrated models 78 which reflect testing data from previous sound level measurements at an exterior region immediately adjacent the outside surface of the vehicle (e.g., at points about 0.5 meters from the vehicle) conducted for given sound levels being generated in the vehicle cabin under various acoustic conditions (e.g., windows open and closed).

Figure 6:
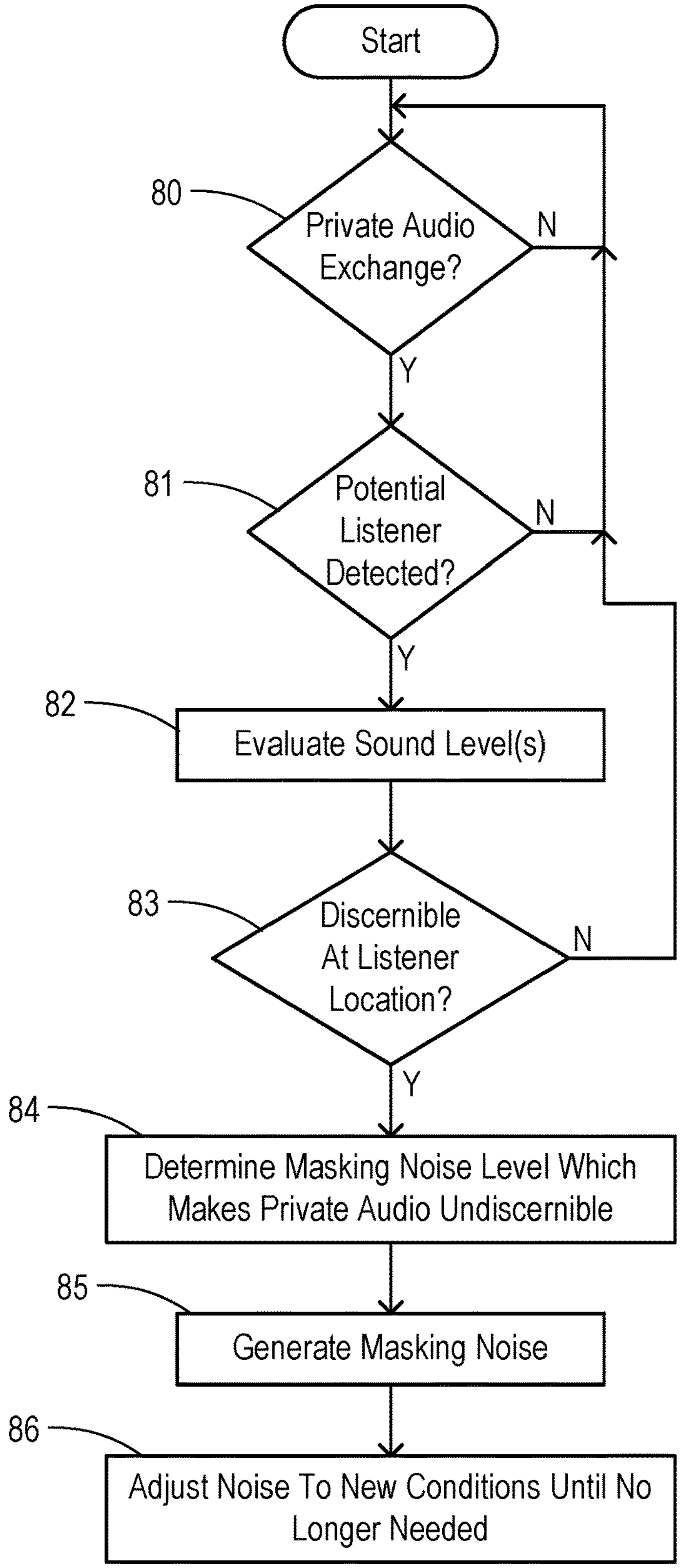
FIG. 6 is a flowchart showing one preferred method of the invention.

FIG. 6 shows a general method according to one exemplary embodiment of the invention. In step 80, a check is regularly performed until it is determined that private audio content is being exchanged in a teleconference. Once a privacy mode is detected, a check is performed to determine whether a potential listener (e.g., pedestrian outside the vehicle) is detected. For example, external sensors such as radar and camera sensors may be used to determine the presence of a person within a predetermined range of the vehicle wherein the predetermined range corresponds to a maximum distance at which overhearing of conversations becomes a concern. When a pedestrian is detected within the range, then sound levels are evaluated in step 82. As described later, the evaluation of sound levels can utilize various embodiments in which acoustic propagation, relative locations, and other factors are used to estimate discernibility of private audio content. In particular, actual sound level of generated audio content and the attenuation of the sound as it travels are evaluated.

Based on the evaluated sound levels, a check is performed in step 83 to determine whether private audio may be discernible (i.e., intelligible) at the listener's location. If not discernible, then steps 80-82 may be repeated as necessary. If it is determined that the private audio may be discernible, then a level and/or content of masking noise which can make the private audio undiscernible is determined in step 84. The content of masking sounds can include music or other prerecorded media (tones or speech) or can be comprised of random noise (preferably having a frequency spectrum spanning the frequency content of the spoken conversation). The frequency range of the conversation can be either measured for the actual spoken conversation to be masked or estimated according to a typical voice (e.g., 150 Hz to 10 kHz). In some embodiments, the frequency of random masking noise may dither around an estimated center frequency of the voice.

In order to determine an appropriate level for generating the masking noise, the distance from the sound source (exciter or loudspeaker) to the pedestrian may be determined. Based on the distance, a corresponding attenuation of the masking noise is determined. Using an estimate of the remote sound level of the audio content of the private conversation when it reaches the pedestrian, a target sound level of the masking noise can be determined which produces a signal-to-noise ratio such that the conversation becomes unintelligible. Some estimates of speech intelligibility suggest that a signal-to-noise ratio of about 12 dB is needed for understanding speech (i.e., the masking noise does not need to be as loud as the sound to be masked). Thus, a target sound level for the masking noise can be selected which degrades the remote signal-to-noise ratio below 12 dB. To determine the masking level to be generated at the vehicle, the target level of the masking noise is increased by the attenuation between the masking noise source and the pedestrian. In some circumstances, it may be desirable to impose a limit on the target sound level. For example, there may be a noise ordinance in effect, or the vehicle controlled may determine that the vehicle is in a location where any sound generation is undesirable such as near a hospital, school, or place of worship. When such a limit is imposed, the vehicle occupants can be informed that privacy cannot be obtained using masking noise and that it is recommended to switch a teleconference to use of a headset or a private mode on their smartphone.

In step 85, the masking noise is generated. Once activated, the masking noise may be maintained for a predetermined time in order to avoid annoying switching on and off of sounds. In step 86, the presence/locations of pedestrians and the sound levels of any private conversations continue to be monitored so that masking noise can be adjusted for changing conditions until masking is no longer needed (e.g., the private conversation ends or no pedestrians are present).

Figure 7:
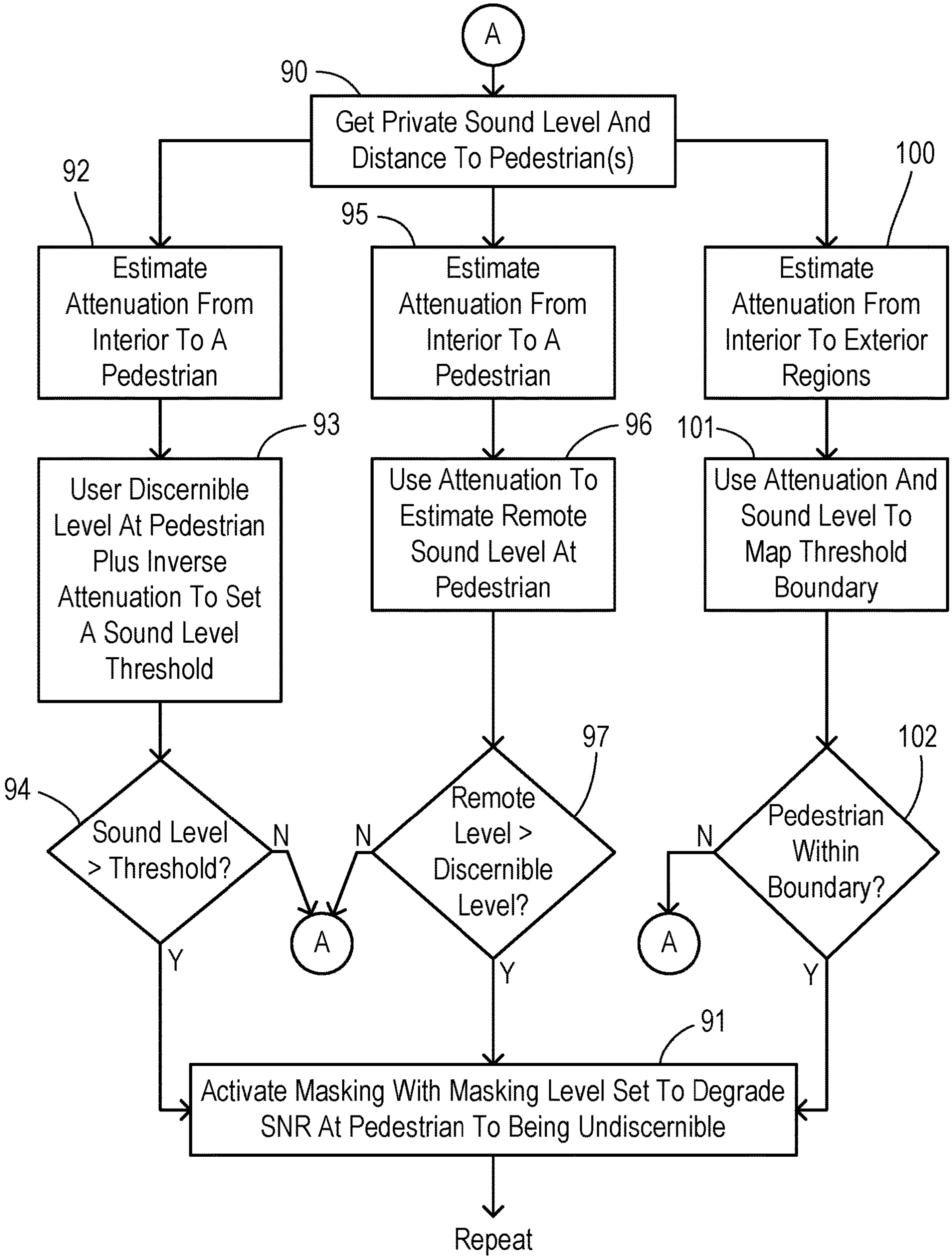
FIG. 7 is a flowchart showing alternate methods for detecting the need for generating masking sounds.

FIG. 7 is a flowchart showing three different embodiments of control methods which determine whether masking noise is needed. In each embodiment, a sound level of a private conversation and a distance to any pedestrians are determined in step 90, and after estimating a discernibility of private speech at the pedestrian location(s) according to the respective embodiments then a sound exciter for the masking noise is activated in step 91 with a masking level set to degrade the remote signal-to-noise ratio to be undiscernible. When measuring an interior sound level of audio content for which privacy is to be maintained, a sound level may be used which corresponds to a peak level occurring during a predetermined time span. Thus, when a situation requiring masking occurs then the masking sound can be maintained during short lulls in the conversation.

In a first embodiment, a sound attenuation is estimated from the vehicle interior to the pedestrian location in step 92. The attenuation estimate may be derived from a lookup table or model compiled from testing data. The table or model may take into account a position of a door, window, or moonroof. In step 93, an interior sound level threshold is determined based on a discernibility level or threshold at the pedestrian at which speech is intelligible (e.g., a signal-to-noise ratio of 12 dB or other parameter such as an absolute sound pressure level). In particular, the discernibility level at the pedestrian is increased by the inverse of the attenuation estimate between the vehicle interior and the pedestrian location to set the interior sound level threshold (i.e., the controller calculates the sound level needed in the interior in order to produce a discernible sound at the location of the pedestrian). A check is performed in step 94 to determine whether the actual (measured) sound level in the vehicle interior is greater than the threshold. If so, then masking noise is activated in step 91. Otherwise, a return is made to step 90 (via point A) for repeated monitoring of the interior sound level and the pedestrian distance.

In a second embodiment, a sound attenuation is estimated from the vehicle interior to the pedestrian location in step 95. The attenuation estimate may be derived from a lookup table or model compiled from testing data. The table or model may take into account a position of a door, window, or moonroof. In step 96, the measured interior sound level and the estimated attenuation between the vehicle interior and the pedestrian location are used to estimate an actual remote sound level of the private conversation at the remote location of the pedestrian. A check is performed in step 97 to determine whether the actual remote sound level of the audio content is greater than a discernible level for the pedestrian. The discernible level may correspond to a signal-to-noise ratio absent any competing noise (e.g., an absolute sound level of 12 dB or any other selected level). If greater, then masking noise is activated in step 91. Otherwise, a return is made to step 90 (via point A) for repeated monitoring of the interior sound level and the pedestrian distance.

In a third embodiment, the level of audio content in the vehicle is used to set a trigger boundary around the vehicle. Thus, in step 100, an estimated attenuation from the vehicle interior along various outward directed vectors is determined (e.g., using a lookup table or model and the positions of windows and doors). Based on the attenuation, a threshold boundary is mapped around the vehicle according to a location in each direction where audio content at the currently measured sound level will attenuate below a discernible level for any pedestrian who may be present. Once the threshold boundary is set (see, e.g., a boundary around region 62 in FIG. 4), a check is performed in step 102 to determine whether a pedestrian is present within the boundary. If so, then masking noise is activated in step 91. Otherwise, a return is made to step 90 (via point A) for repeated monitoring of the interior sound level and the pedestrian distance.

What is claimed is:

1. A transportation vehicle comprising:

a passenger cabin defining an interior, an exterior, and at least one seating location in the interior for conducting a teleconference with a remote party;

at least one internal microphone receiving a first portion of an audio content of the teleconference spoken by a vehicle occupant;

at least one internal speaker generating a second portion of the audio content of the teleconference spoken by the remote party;

a sound exciter configured to generate a masking noise directed to the exterior; and a control circuit enhancing privacy of the teleconference and configured to:

detect the audio content of the teleconference being present in the interior of the vehicle;

quantify an interior sound level of the audio content;

estimate a discernability of the audio content at an external location accessible to passersby where the audio content can be overheard by the passersby; and activate the sound exciter such that the masking noise is adapted to mask the audio content at the external location.

2. The transportation vehicle of claim 1 wherein the estimating a discernability of the audio content is comprised of determining a sound attenuation from the interior to the external location, determining a remote sound level according to the interior sound level and the sound attenuation, and comparing the remote sound level to a discernibility threshold of the passersby at the external location.

3. The transportation vehicle of claim 1 wherein the estimating a discernability of the audio content is comprised of determining a sound attenuation between the interior and the external location, determining an internal audio threshold according to a discernibility threshold of the passersby and the sound attenuation, and comparing the interior sound level to the internal audio threshold.

4. The transportation vehicle of claim 1 wherein the estimating a discernability of the audio content is comprised of determining a sound attenuation between the interior and the exterior, determining a threshold distance from the vehicle at which a remote sound level of the audio content drops to a discernibility threshold according to the sound attenuation and the interior sound level, and comparing a relative distance of the external location to the threshold distance.

5. The transportation vehicle of claim 1 wherein the interior sound level is comprised of a peak level during a predetermined time span.

6. The transportation vehicle of claim 5 wherein the interior sound level is measured from a microphone signal from the internal microphone or from an audio signal fed to the internal speaker.

7. The transportation vehicle of claim 1 wherein the estimating a discernability of the audio content is comprised of determining a sound attenuation at least partially in response to a position of a door, a window, or a moonroof.

8. The transportation vehicle of claim 1 wherein the control circuit is configured to activate the sound exciter only when a privacy mode is activated.

9. The transportation vehicle of claim 8 wherein the privacy mode is activated according to a manual activation, a scheduled time for the teleconference, a predetermined list of participants, or a spoken keyword.

10. The transportation vehicle of claim 1 wherein the masking noise is comprised of randomized sound over a frequency band corresponding to the audio content of the teleconference.

11. The transportation vehicle of claim 1 wherein the control circuit is configured to host separate teleconferences according to a plurality of zones in the interior simultaneously, wherein the internal microphone is included within a plurality of microphones, and wherein each microphone is focused to a respective one of the zones.

12. The transportation vehicle of claim 1 wherein the sound exciter is comprised of a directional sound generator.

13. A method of enhancing privacy of spoken communications in a vehicle, comprising the steps of:

activating a privacy mode for a teleconference conducted by a vehicle occupant in an interior of the vehicle with a remote party;

detecting an exterior location within a predetermined vicinity of the vehicle which is accessible to passersby;

sensing a relative distance from the vehicle to the external location;

quantifying an interior sound level of audio content of the teleconference;

estimating a discernability of the audio content at the external location; and activating a sound exciter to project a masking noise to the external location if the discernability is greater than a threshold.

14. The method of claim 13 wherein the step of estimating the discernability of the audio content is comprised of determining a sound attenuation from the interior to the external location, determining a remote sound level according to the interior sound level and the sound attenuation, and comparing the remote sound level to a discernibility threshold of the passersby at the external location.

15. The method of claim 13 wherein the step of estimating the discernability of the audio content is comprised of determining a sound attenuation between the interior and the external location, determining an internal audio threshold according to a discernibility threshold of the passersby and the sound attenuation, and comparing the interior sound level to the internal audio threshold.

16. The method of claim 13 wherein the step of estimating the discernability of the audio content is comprised of determining a sound attenuation between the interior and the exterior, determining a threshold distance from the vehicle at which a remote sound level of the audio content drops to a discernibility threshold according to the sound attenuation and the interior sound level, and comparing the relative distance of the external location to the threshold distance.

17. The method of claim 13 wherein the interior sound level is comprised of a peak level during a predetermined time span.

18. The method of claim 13 wherein the masking noise is comprised of randomized sound over a frequency band corresponding to the audio content of the teleconference.

19. The method of claim 13 wherein the activating step is comprised of a manual activation, a scheduled time for the teleconference, a predetermined list of participants, or a spoken keyword.

20. The method of claim 13 wherein the step of estimating the discernability of the audio content is comprised of determining a sound attenuation at least partially in response to a position of a door, a window, or a moonroof.

* * * * *